United States Patent
Kaczynski et al.

(10) Patent No.: US 6,816,263 B2
(45) Date of Patent: Nov. 9, 2004

(54) INTERFEROMETRIC MEASUREMENT APPARATUS FOR WAVELENGTH CALIBRATION

(75) Inventors: Ulrich Kaczynski, Bad Nauheim (DE); Klaus Rinn, Heuchelheim (DE)

(73) Assignee: Leica Microsystems Semiconductor GmbH, Wetzlar (DE)

(*) Notice: Subject to any disclaimer, the term of this patent is extended or adjusted under 35 U.S.C. 154(b) by 292 days.

(21) Appl. No.: 10/189,198

(22) Filed: Jul. 5, 2002

(65) Prior Publication Data

US 2003/0025910 A1 Feb. 6, 2003

(30) Foreign Application Priority Data

Jul. 4, 2001 (DE) ......................................... 101 31 898

(51) Int. Cl.[7] .............................................. G01B 9/02
(52) U.S. Cl. ...................................................... 356/450
(58) Field of Search ............................... 356/450, 451, 356/517

(56) References Cited

U.S. PATENT DOCUMENTS 4,319,843 A * 3/1982 Gornall ..................... 356/455
6,552,801 B1 * 4/2003 Akikuni et al. ............. 356/498

FOREIGN PATENT DOCUMENTS

DE    198 19 492    11/1999

* cited by examiner

*Primary Examiner*—Samuel A. Turner
*Assistant Examiner*—Patrick Connolly
(74) *Attorney, Agent, or Firm*—Crowell & Moring LLP

(57) ABSTRACT

The present invention concerns an interferometric measurement apparatus for wavelength calibration, having a laser light source (1), a detector (2), and an interferometer (3), the laser light source (1) emitting light of at least one wavelength, the interferometer (3) separating the light of the laser light source (1) into two sub-beams (4, 5)—a reference beam (4) and a measurement beam (5)—and combining the sub-beams (4, 5) again after at least one reflection at one reflection means (6) each, and the path length difference between the reference beam (4) and measurement beam (5) defining a constant wavelength calibration distance. In order to increase the measurement accuracy and reduce measurement errors, the measurement beam distance can be extended, but without causing problems in terms of manufacture, assembly, and/or alignment. The interferometric measurement apparatus according to the present invention is characterized in that at least one additional reflection means (8), which reflects the measurement beam (5) at least largely in the opposite direction, is provided in the beam path of the measurement beam (5).

11 Claims, 3 Drawing Sheets

INTERFEROMETRIC MEASUREMENT APPARATUS FOR WAVELENGTH CALIBRATION

CROSS REFERENCE TO RELATED APPLICATIONS

This application claims priority of the German patent application 101 31 898.7 which is incorporated by reference herein.

FIELD OF THE INVENTION

The present invention concerns an interferometric measurement apparatus for wavelength calibration, having a laser light source, a detector, and an interferometer, the laser light source emitting light of at least one wavelength, the interferometer separating the light of the laser light source into two sub-beams—a reference beam and a measurement beam—and combining the sub-beams again after at least one reflection at one reflection means each, and the path length difference between the reference beam and measurement beam defining a constant wavelength calibration distance.

BACKGROUND OF THE INVENTION

Interferometric measurement apparatuses are used in many ways for highly accurate spacing and position measurements. In a high-accuracy interferometric measurement, what is usually measured is the relative path length difference between a measurement mirror on a movable measured specimen in the measurement beam path and a reference mirror in the reference beam path. The way in which the phase of the light changes as the measured specimen moves is determined during measurement, the wavelength of the light beam being the measurement criterion. The relative path length is thus indicated using "wavelength" as the unit. The instantaneous value of the wavelength of a light beam depends on the refractive index of the medium traversed by the light beam. The refractive index varies, for example, as a result of slow changes or rapid fluctuations in temperature, air pressure, and atmospheric humidity, or changes in atmospheric composition. In typical measurements on wafers and masks with, for example a coordinate measuring instrument, the fluctuations in the measurement results due to wavelength changes are approximately ±0.1 μm, i.e. no longer negligible as compared to the features being measured, and therefore not tolerable in terms of the required measurement accuracy.

In order to increase the measurement accuracy, a consideration of the change in the wavelength of the light beam, in the form of a continuous wavelength correction, is necessary.

For high-accuracy distance measurements the coordinate measuring instrument could, as is known e.g. from DE 198 19 492, be operated in a climate chamber. In this at least the temperature, and in some climate chambers the atmospheric moisture as well, is held constant. There are technical limits to the accuracy with which temperature and atmospheric moisture can be controlled. It is also impossible, with acceptable outlay, to manufacture hermetically sealed chambers to maintain a constant air pressure, especially since, taking the example of the coordinating measuring instrument, easy and quick interchange of measured specimens is a necessity. For example, merely actuating the loading opening causes rapid fluctuations in air pressure.

The interferometer wavelength must therefore be continuously acquired in a separate measurement. This can be done by measuring a wavelength calibration distance of constant length (so-called "wavelength tracker") or by measuring the influencing factors such as temperature, atmospheric moisture, etc. and continuously calculating the instantaneous wavelength. This wavelength correction is inherently subject to error, however, for example because the precision of the measurements underlying it is only finite or because a high-precision measurement is not necessarily fast enough to reproduce rapid changes in the measured variable. The wavelength correction thus also contributes an error to the corrected wavelength.

Especially in interferometric measurement apparatuses in which interferometric measurements are performed with light of two different wavelengths, one considerable error source is constituted by the finite resolution upon measurement of the phase difference at the interferometer output, and by the so-called interpolator error. The latter occurs in heterodyne lasers because the polarization separation of the two laser wavelengths is not ideal. Small amounts of laser light of the wrong wavelength are therefore present in the two polarization components. One example of an interferometric measurement apparatus is the commercially available HP 10702 laser interferometer of the Hewlett-Packard company.

The two aforementioned error components have a fixed maximum magnitude that is independent of the length of the measurement distance. The measurement error $\delta L$ upon measurement of a wavelength calibration distance of length L is incorporated into the distance measurement as a relative error $\delta L/L$. It could therefore be suppressed or at least reduced by making the wavelength calibration distance long enough. The reference measurement error will be small compared to the measurement if the reference distance is correspondingly small compared to the wavelength calibration distance. Such wavelength calibration distances do exist and are commercially available—again from the Hewlett-Packard company, as model 10717 A—but they do not meet this length condition for distance measurements in the range exceeding 50 mm.

Very long wavelength calibration distances require a very considerable amount of physical space, especially when built into coordinate measuring instruments for measuring masks and wafers. An obvious solution is therefore to fold the laser beam, i.e. to reflect the laser beam several times within the wavelength calibration distance. Arrangements are known in which the light beam is slightly tilted, so that the laser beam travels several times along the beam path in "zigzag" fashion. This arrangement offers maximum extension of the measurement distance, but the manufacture, assembly, and alignment of this type of mirror arrangement at small tilt angles is very difficult.

SUMMARY OF THE INVENTION

It is therefore the object of the present invention to describe and develop an interferometric measurement apparatus for wavelength calibration of the species, such that in order to increase the measurement accuracy and to decrease the measurement error, the measurement beam distance can be extended without, however, causing problems in manufacture, assembly, and/or alignment.

The interferometric measurement apparatus of the species according to the present invention achieves the aforesaid object by way of the features of claim 1. According to the latter, an interferometric measurement apparatus of this kind is characterized in that at least one additional reflection means, which reflects the measurement beam at least largely in the opposite direction, is provided in the beam path of the measurement beam.

What has been recognized firstly is that the length of a sub-beam can be extended by way of an additional reflection—as is already known from the existing art. In accordance with the present invention, however, the measurement beam is reflected at least largely in the opposite direction, i.e. the measurement beam striking the additional reflection means and reflected therefrom does not enclose an acute angle of, for example, 10 or 20 degrees, which is problematic to handle especially in terms of manufacture and assembly. What is provided instead is an additional reflection that, for example, reflects the light beam back into itself or parallel to the incident beam. With this action, the measurement error of the wavelength calibration distance can be reduced; for example, if the wavelength calibration distance is doubled, the measurement error can thus be halved. In particularly advantageous fashion, the additional reflection of the measurement beam can be implemented economically with little additional design effort by insertion of an additional reflection means, modest requirements being applied in terms of the alignment and manufacturing tolerances necessary in this context.

In a very particularly preferred embodiment, the additional reflection means reflects back the measurement beam that strikes it in the opposite direction substantially with a parallel offset. This embodiment advantageously makes possible an extension of the respective partial distance, but without requiring substantially more installation space. As a result, with a suitable arrangement of the reflection means, the measurement beam can be guided back and forth several times.

One of the reflection means could be arranged on the interferometer. For example, a reflection means configured as a mirror (assuming a plane-parallel shape for the mirror) could simply be adhesive-mounted onto a corresponding location on the interferometer, thus making possible very particularly simple manufacture with almost negligible alignment effort.

In a very particularly preferred embodiment, the reflection means for the measurement beam is configured integrally with the additional reflection means. Assuming suitable manufacture with appropriate accuracy, it is thereby possible to ensure guidance of the sub-beam in accordance with the present invention with no need for complex alignment of various components relative to one another.

As an alternative to this, the reflection means for the measurement beam could be arranged with the additional reflection means for the measurement beam on a common mount. The reflection means for the measurement beam is thus constrainedly coupled to the additional reflection means via one and the same mount, here again making possible simple prefabrication of the subassembly comprising the reflection means, additional reflection means, and mount; alignment of the individual components relative to one another could already be performed in the context of prefabrication.

The reflection means could be configured as a mirror or as a reflecting prism. If a mirror or plane mirror is used as the reflection means, it would need to be arranged with its reflective mirror surface orthogonal to the measurement beam, so that the measurement beam striking the mirror or plane mirror is substantially reflected back into itself. If a reflecting prism is used as the reflection means—and assuming an appropriate configuration of the reflecting mirror and an appropriate arrangement in the measurement beam—a substantially parallel-offset reverse reflection of the measurement beam at the reflection prism could be accomplished.

In a particularly preferred embodiment, the reflection means comprises two mirrors. The reflective surfaces of the mirrors are arranged at an angle of substantially 90 degrees to one another. The mirror of the reflection means arranged first (as viewed from the interferometer) in the measurement beam path could be arranged at an angle of substantially 45 degrees to the measurement beam, so that the light beam reflected at the first mirror strikes the second mirror also at an angle of substantially 45 degrees, and after another reflection the reflection means reflects the light beam back substantially at a parallel offset from the light beam coming from the interferometer.

In a concrete embodiment, the reflection means are arranged on a common mount. The mount comprises two beveled surfaces that are at an angle of substantially 90 degrees to one another. The two mirrors of the additional reflection means can be mounted directly onto the beveled surfaces. For easier manufacture, the mount could comprise two or more parts.

In particularly advantageous fashion, provision is made for equipping a microscope, and in particular a coordinate measuring instrument, with an interferometric measurement apparatus for wavelength calibration as defined in one of claims 1 through 8. It is thereby possible, for example in a coordinate measuring instrument, to detect the variation in wavelength as a function of air pressure, air temperature, atmospheric moisture, and/or atmospheric composition in a manner according to the present invention.

There are various ways of advantageously embodying and developing the teaching of the present invention. The reader is referred, for that purpose, on the one hand to the claims subordinate to claim 1, and on the other hand to the explanation below of the preferred exemplary embodiments of the invention with reference to the drawings. In conjunction with the explanation of the preferred exemplary embodiments of the invention with reference to the drawings, an explanation is also given of generally preferred embodiments and developments of the teaching.

DETAILED DESCRIPTION OF THE INVENTION

Figure 1:
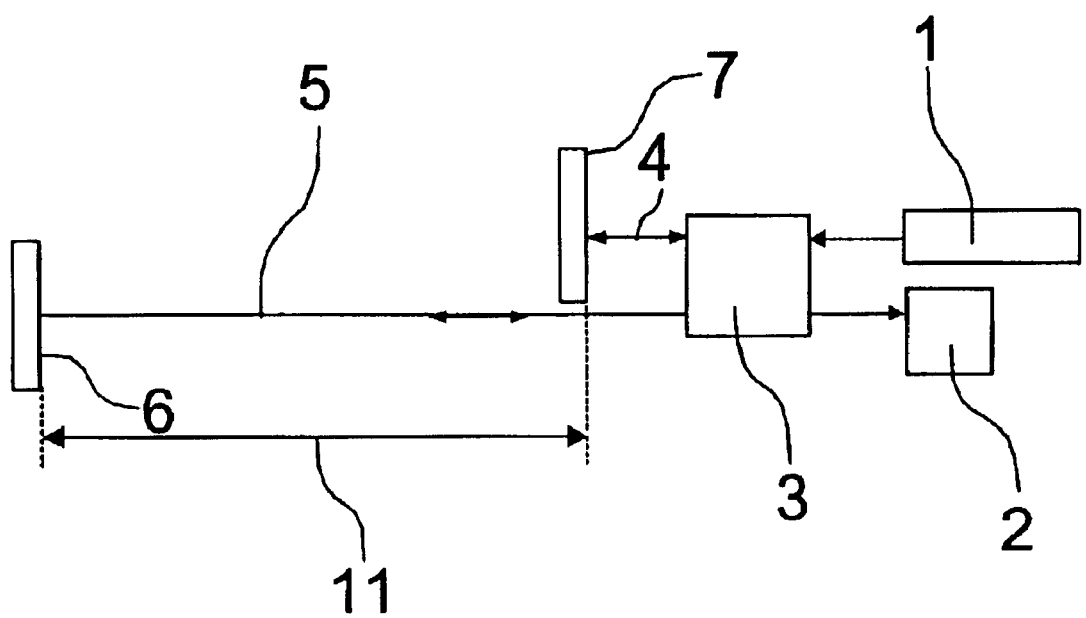
FIG. 1 schematically depicts an interferometric measurement apparatus known from the existing art.
Figure 2:
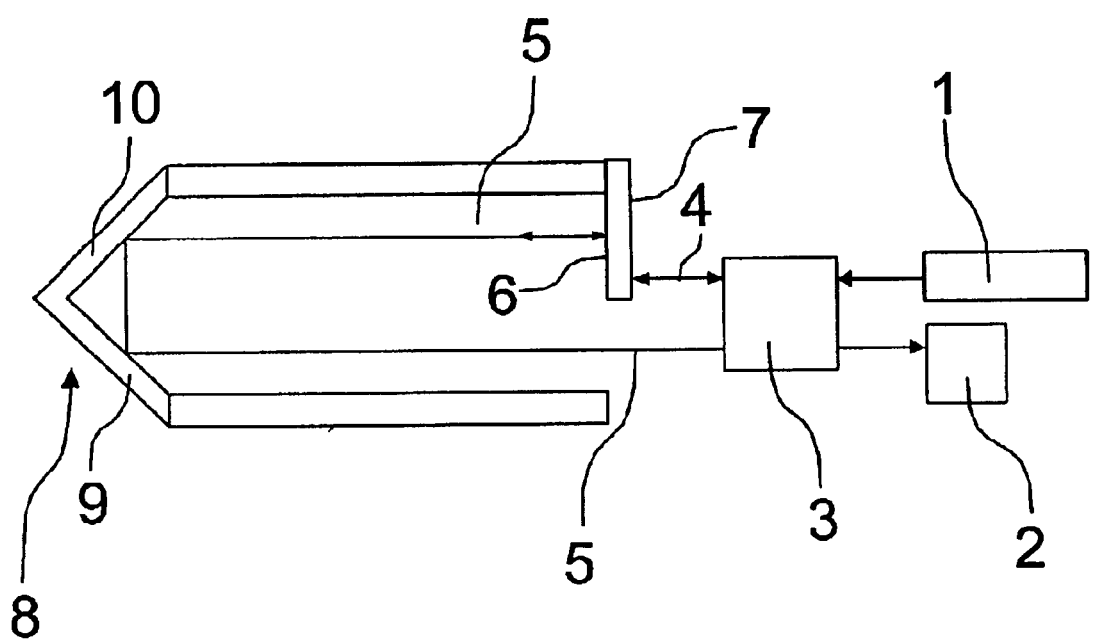
FIG. 2 schematically depicts an exemplary embodiment of the present invention.

FIGS. 1 and 2 schematically depict an interferometric measurement apparatus for wavelength calibration, having a laser light source 1, a detector 2, and an interferometer 3. The laser light source 1 emits light of two different wavelengths. Interferometer 3 separates the light of laser light source 1 into two sub-beams 4, 5, namely into a reference beam 4 and a measurement beam 5. Interferometer 3 combines the two sub-beams 4, 5 after two reflections at reflection means 6, 7. The path length difference between reference beam 4 and measurement beam 5 defines a constant wavelength calibration distance 11 that is shown only in FIG. 1.

According to the present invention, an additional reflection means 8 that reflects measurement beam 5 in the opposite direction is provided in the interferometric measurement apparatus shown in FIG. 2.

The interferometric measurement apparatus shown in FIG. 2 serves to detect wavelength changes in the light emitted by laser light source 1 as a result of changes in environmental conditions. The distance traveled by measurement beam 5 has a constant length. Measurement beam 5 is reflected by additional reflection means 8 back in the opposite direction with a parallel offset, so that measurement beam 5 is extended by additional reflection means 8 in conjunction with reflection means 6.

It is evident from FIG. 2 that reflection means 6 for measurement beam 5 is configured integrally with additional reflection means 8. This is therefore a single component. Reflection means 6 of FIG. 2 functions as a mirror, i.e. the integral component is equipped at this location with a mirror coating.

Additional reflection means 8 of FIG. 2 comprises two mirrors 9, 10. The reflective surfaces of the mirrors are arranged at a 90-degree angle to one another. Additional reflection means 8 could also be configured integrally, so to speak as a right-angle mirror. In this context as well, the reflective surfaces are arranged at a 90-degree angle to one another.

Figure 3:
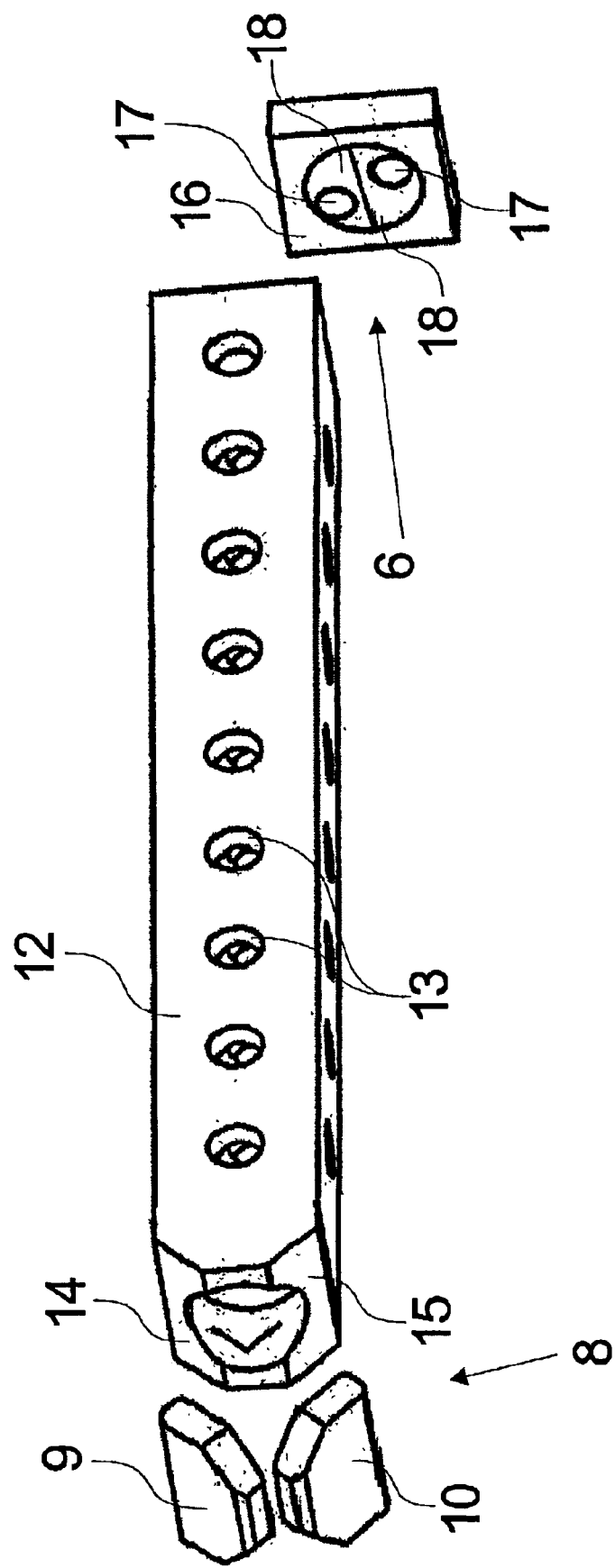
FIG. 3 schematically depicts a concrete physical embodiment based on FIG. 2.

FIG. 3 shows mount 12 of reflection means 6 and of additional reflection means 8 in a schematic three-dimensional exploded view. Mount 12 has a parallelepipedal external shape, is internally hollow, and comprises multiple passages 13. Ambient air can pass through passages 13 so that the influence of the ambient air on the wavelength can be measured with the interferometric measurement apparatus according to the present invention. Additional reflection means 8 in this case comprises the two mirrors 9 and 10, which are mounted directly onto the two beveled surfaces 14 and 15. Beveled surfaces 14, 15 are at a 90-degree angle to one another, which can be produced very accurately with a suitable milling machine. Mirrors 9 and 10 are snapped onto the respective beveled surfaces 14 and 15, i.e. a mirror is first placed onto the respective surface and then shifted a short distance, a slight pressure being exerted on the mirror in the direction of the surface. Because of the adhesive force between mount 12 and mirror 9 or 10, mirrors 9, 10 are thereby joined to one another. The external surfaces are then sealed with a lacquer in order to prevent corrosion of the components.

Component 16 is also snapped onto mount 12. Component 16 comprises two passages 17 through which measurement beam 5 (not shown in FIG. 3) enters the mount. The two passages 17 are provided because two measurement beams proceed from the interferometer. Component 16 additionally has a mirror-coated region 18 that reflects back the measurement beam reflected at the two mirrors 9, 10.

In conclusion, be it noted very particularly that the exemplary embodiments discussed above serve merely to describe the teaching claimed, but do not limit it to the exemplary embodiments.

| PARTS LIST | |
|---|---|
| 1 | Laser light source |
| 2 | Detector |
| 3 | Interferometer |
| 4 | Sub-beam, reference beam |
| 5 | Sub-beam, measurement beam |
| 6 | Reflection means |
| 7 | Reflection means |
| 8 | Additional reflection means |
| 9 | Mirror |
| 10 | Mirror |
| 11 | Wavelength calibration distance |
| 12 | Mount |
| 13 | Passages in mount 12 |
| 14 | Beveled surface |
| 15 | Beveled surface |
| 16 | Component |

| -continued | |
|---|---|
| PARTS LIST | |
| 17 | Passage |
| 18 | Mirror-coated region of 16 |

What is claimed is:

1. An interferometric measurement apparatus for wavelength calibration, comprising:

a laser light source (1) emitting light of at least one wavelength, a detector (2), an interferometer (3) which separates the light of the laser light source (1) into two sub-beams (4, 5)—a reference beam (4) and a measurement beam (5)—and combines the sub-beams (4, 5) again after at least one reflection at one reflection means (6, 7) each, wherein a path length difference between the reference beam (4) and measurement beam (5) defines a constant wavelength calibration distance (11), and at least one additional reflection means (8) placed in the beam path of the measurement beam (5), said additional reflection means (8) reflecting the measurement beam (5) at least largely in the opposite direction.

2. The measurement apparatus as defined in claim 1, wherein the additional reflection means (8) reflects back the measurement beam (5) that strikes it in the opposite direction substantially with a parallel offset.

3. The measurement apparatus as defined claim 2, wherein one of the reflection means (6) is arranged on the interferometer.

4. The measurement apparatus as defined claim 2, wherein the reflection means (6) for the measurement beam (5) is configured integrally with the additional reflection means (8) or is arranged on a common mount (12).

5. The measurement apparatus as defined claim 3, wherein the reflection means (6) for the measurement beam (5) is configured integrally with the additional reflection means (8) or is arranged on a common mount (12).

6. The measurement apparatus as defined in claim 1, wherein the reflection means (6, 7, 8) is configured as a mirror or as a reflecting prism.

7. The measurement apparatus as defined in claim 1, wherein the reflection means (8) comprises two mirrors (9, 10).

8. The measurement apparatus as defined in claim 6, wherein the reflective surfaces of the mirrors (9, 10) are arranged at an angle of substantially 90 degrees to one another.

9. The measurement apparatus as defined in claim 8, wherein the reflection means (6, 7, 8) are arranged on a common mount (12) and wherein the mount (12) comprises two beveled surfaces (14, 15) that are at an angle of substantially 90 degrees to one another; and the two mirrors (9, 10) can be mounted directly onto the beveled surfaces (14, 15).

10. A microscope, in particular a coordinate measuring instrument, comprising an interferometric measurement apparatus for wavelength calibration as defined in claim 1.

11. A microscope, in particular a coordinate measuring instrument, comprising an interferometric measurement apparatus for wavelength calibration as defined in claim 9.

* * * * *